United States Patent [19]
Kikuchi

[11] Patent Number: 5,325,420
[45] Date of Patent: Jun. 28, 1994

[54] CORDLESS PHONE HAAVING A PLURALITY OF PERSONAL STATIONS

[75] Inventor: Tetuya Kikuchi, Kawasaki, Japan
[73] Assignee: Fujitsu Limited, Kawasaki, Japan
[21] Appl. No.: 954,672
[22] Filed: Sep. 30, 1992
[51] Int. Cl.$^5$ .......................................... H04M 11/02
[52] U.S. Cl. ..................................................... 379/61
[58] Field of Search ............................. 379/58, 61, 63; 455/54.1

[56] References Cited

U.S. PATENT DOCUMENTS

| 4,875,231 | 10/1989 | Hara et al. | 379/63 |
| 5,133,002 | 7/1992 | Kikuchi et al. | 379/58 |
| 5,136,629 | 8/1992 | Toyama et al. | 379/58 |

FOREIGN PATENT DOCUMENTS

| 0118241 | 9/1980 | Japan | 379/58 |
| 0227145 | 10/1991 | Japan | 379/63 |
| 0267637 | 9/1992 | Japan . | |
| 2128453 | 4/1984 | United Kingdom | 379/61 |

Primary Examiner—James L. Dwyer
Assistant Examiner—Dwayne D. Bost

[57] ABSTRACT

A cordless phone includes a base station coupled to a line and a plurality of a personal stations communicating with the base station by radio. The base station includes a call detecting circuit for detecting a calling signal corresponding to a ringing tone when the cordless phone is called by an external station, a control signal generator for generating a control signal in synchronism with the calling signal detected by the call detecting circuit, and a circuit for simultaneously transmitting to the plurality of personal stations the control signal generated by the control signal generator. Each of the personal stations includes a ringing tone output circuit for outputting a ringing tone in synchronism with the control signal received by the each of the personal stations, a counter for counting a predetermined clock signal, a reset circuit for resetting the counter to be in an initial state in synchronism with the control signal received by the each of the personal stations, and a carrier transmitter for transmitting a carrier signal to the base station every time a count value of the counter means becomes an identification value identifying the each of the personal stations, a predetermined response signal being transmitted to the base station with the carrier signal.

6 Claims, 7 Drawing Sheets

| SYNC. | ID | SUB ID | CARRIER ON | RINGING ON / OFF |
|---|---|---|---|---|

CORDLESS PHONE HAAVING A PLURALITY OF PERSONAL STATIONS

BACKGROUND OF THE INVENTION (1) Field of the Invention

The present invention generally relates to a cordless phone having a plurality of personal stations, and more particularly to a cordless phone having a plurality of personal stations and a base station provided with a radio unit communicating with the plurality of personal stations, in which a general calling of the plurality of personal stations can be performed.

(2) Description of Related Art

As more functions are provided for cordless phones, a cordless phone in which a plurality of personal stations can be used is desired. In general, in a case where a cordless phone is provided with a plurality of personal station, the base station must be provided with a plurality of radio units respectively communicating with the plurality of personal stations. In this case, the cost of the cordless phone increases. Thus, it is possible that a plurality of the personal stations share one radio unit in the base station. To prevent that each personal station be determined as a free channel and would be interrupted from other cordless phones, each of the personal stations outputs a carrier signal used for transmission of signals (e.g. a hook signal indicating an on/off-hook operation). In this case, the base station cannot simultaneously receive carriers output from each of the plurality of personal stations. Thus, a time sharing transmission of the carriers has to be performed in a radio channel between the base station and the plurality of personal stations.

A conventional cordless phone provided with a plurality of personal stations will be described below.

Figure 1:
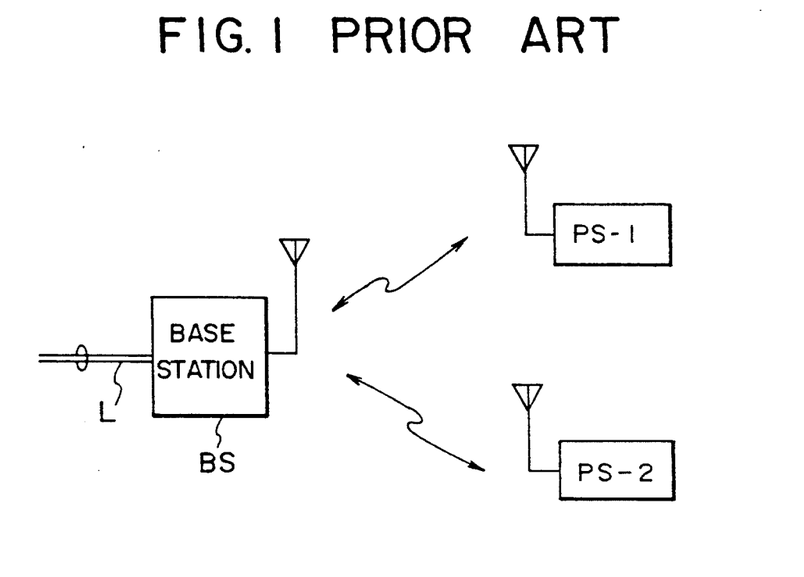
FIG. 1 is a block diagram illustrating a cordless phone provided with a plurality of personal stations.
Figure 3:
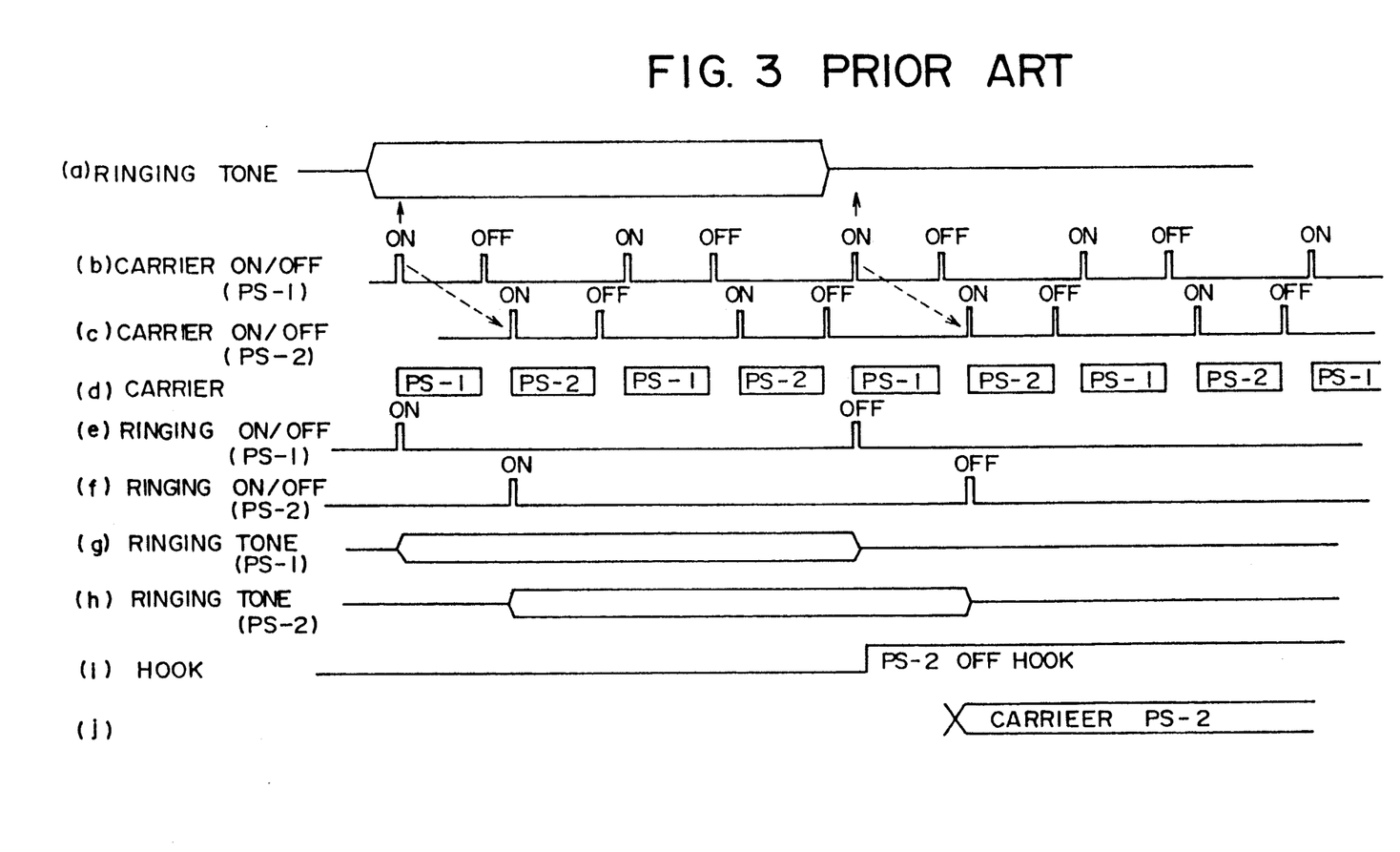
FIG. 3 is a time chart illustrating a control processing of a conventional cordless phone.

FIG. 1 shows a conventional cordless phone having, for example, two personal stations. That is, a base station BS is connected to a line L, and a first personal station PS-1 and a second personal station PS-2 communicate with the base station BS by radio. Operations of the cordless phone in a case of a call-in are shown in FIG. 3. Referring to FIG. 3, a ringing tone signal (a) is activated at predetermined intervals. The base station BS controls output timings of carrier signals from the first and second personal stations PS-1 and PS-2. That is, the base station BS transmits a carrier-on signal to the first personal station PS-1 via a control channel (b). When the first personal terminal PS-1 receives the carrier-on signal, the first personal terminal PS-1 starts outputting a carrier signal (d). Then, the base station receives the carrier signal (d) returned from the first personal station PS-1, a carrier-off signal is transmitted from the base station BS to the first personal station PS-1. When the first personal station PS-1 receives the carrier-off signal, the first personal station PS-1 stops outputting the carrier signal. Then the first personal station PS-1 switches to a service channel identified by the base station BS and becomes in a receive state. After the transmission of the carrier-off signal to the first personal station TS-1, the base station BS transmits a carrier-on signal to the second personal station PS-2 (c). When the second personal station PS-2 receives the carrier-on signal, the second personal station PS-2 starts outputting a carrier signal (d). The base station BS receives the carrier signal returned from the second personal station PS-2, and a carrier-off signal is transmitted from the base station to the second personal station PS-2. When the second personal station PS-2 receives the carrier-off signal, the second personal station PS-2 stops outputting the carrier signal. After this, the base station repeats a transmission of the carrier-on signal and the carrier-off signal to the first personal station PS-1 and a transmission of the carrier-on signal and the carrier-off signal to the second personal station PS-2, in the same manner as that described above. As a result, the first and second personal stations PS-1 and PS-2 alternately output the carrier signals. That is, the time sharing transmission of the carrier signals is performed in the control channel between the base station and first and second personal stations PS-1 and PS-2.

The base station BS checks whether or not the ringing tone signal is activated when the carrier-on signal is transmitted to a personal station. When the base station BS detects that the ringing tone signal is activated, the base station BS transmits a ringing-on signal to the personal station (PS-1 or PS-2) with the carrier-on (e or f). When the personal station receives the ringing-on signal, the personal station starts outputting a ringing tone (g or h). When, after outputting the ringing-on signal, the base station BS detects that the ringing tone signal is not activated, the base station BS transmits a ringing-off signal to the personal station. When the personal station receives the ringing-off signal, the personal station stops outputting the ringing tone.

Figure 2:
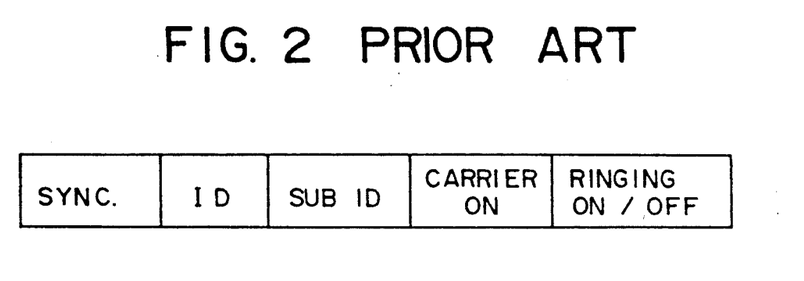
FIG. 2 is a diagram illustrating a format of a telegraphic message including a carrier-on signal and a ringing-on/off signal.

The ringing-on signal and the ringing-off signal described above are included in a telegraphic message used for transmitting the carrier-on signal. The telegraphic message has a format, for example, as shown in FIG. 2. That is, the telegraphic message is formed of a synchronous signal (SYNC.), an identification code identifying a radio channel formed between the base station BS and the personal stations, a sub-identification code (SUB ID) identifying a personal station (PS-1 or PS-2) to which the telegraphic message should be transmitted, the carrier-on signal and the ringing-on/off signal.

Due to the above processes, the first and second personal stations PS-1 and PS-2 output the ringing tones. That is, a general calling of the first and second personal stations PS-1 and PS-2 is performed. Under a condition in which the ringing tones are being output from the first and second personal stations PS-1 and PS-2, when, for example, an off-hook operation of the second personal station is carried out, the second personal station PS-2 activates a hook signal (i) and the activated hook signal is transmitted to the base station BS. The base station receives the activated hook signal transmitted from the second personal station PS-2 and transmits a command to stop outputting the ringing tone to the first personal station PS-1. When the first personal station receives the command, the first personal station stops outputting the ringing tone. After the off-hook operation, the second personal station PS-2 continuously outputs the carrier signal(j). A communication between the second personal station PS-2 and the base station BS is performed via the service channel, so that the second personal station PS-2 can communicate with the external station via the base station BS.

In the above conventional cordless phone having the plurality of personal stations, as the base station controls output timings of the carries from the personal stations, the base station must determine what number of personal stations are operatively coupled thereto. In addition, the base station must transmit the carrier-on signal and the carrier-off signal alternately to every personal station. Thus, control processing in the base station is complex. Further, the carrier-on signals and the carrier-off signals for a plurality of personal stations are output from the base station at times different from each other, so that the ringing tones are not simultaneously output from the plurality of personal stations, as shown in (g) and (h) of FIG. 3. Thus, the ringing tones output from the plurality of personal stations are unpleasant.

SUMMARY OF THE INVENTION

Accordingly, a general object of the present invention is to provide a novel and useful cordless phone having a plurality of personal stations in which the disadvantages of the aforementioned prior art are eliminated.

A more specific object of the present invention is to provide a cordless phone in which time sharing transmission of carrier signals from a plurality of personal stations can be easily performed.

Another object of the present invention is to provide a cordless phone in which, when the cordless phone is called by an external station via a line, ringing tones can be approximately simultaneously output from a plurality of personal stations.

The above objects of the present invention are achieved by a cordless phone comprising a base station coupled to a line and a plurality of personal stations communicating with the base station by radio, the base station comprising: call detecting means for detecting a calling signal corresponding to a ringing tone when the cordless phone is called by an external station; control signal generating means, coupled to the call detecting means, for generating a control signal in synchronism with the calling signal detected by the call detecting means; and means, coupled to the control signal generating means, for transmitting the control signal generated by the control signal generating means to the plurality of personal stations simultaneously; each of the personal stations comprising: ringing tone output means for outputting a ringing tone in synchronism with the control signal received by the each of the personal stations; counter means for counting a predetermined clock signal; reset means for resetting the counter means to be in an initial state in synchronism with the control signal received by each of the personal stations; and carrier transmission means for transmitting a carrier signal to the base station every time a count value of the counter means becomes an identification value identifying the each of the personal stations, a predetermined response signal being transmitted to the base station with the carrier signal.

According to the present invention, as the base station may transmit only the control signal generated based on the calling signal, the control processing in the base station is very simple. As the base station does not directly control the output timings of carrier signals from the plurality of the personal stations, it is not needed for the base station to determine what number of personal stations is operatively coupled there to. The control signal is simultaneously transmitted from the base station to the plurality of personal stations. Thus, the ringing tones are approximately simultaneously output from the plurality of personal stations in synchronism with the control signal transmitted from the base station. The ringing tones output from the plurality of personal stations are prevented from being unpleasant.

Additional objects, features and advantages of the present invention will become apparent from the following detailed description when read in conjunction with the accompanying drawings.

DESCRIPTION OF THE PREFERRED EMBODIMENTS

A description will now be given of the principle of an embodiment of the present invention with reference to FIG. 4 and FIGS. 5A, 5B and 5C.

Figure 4:
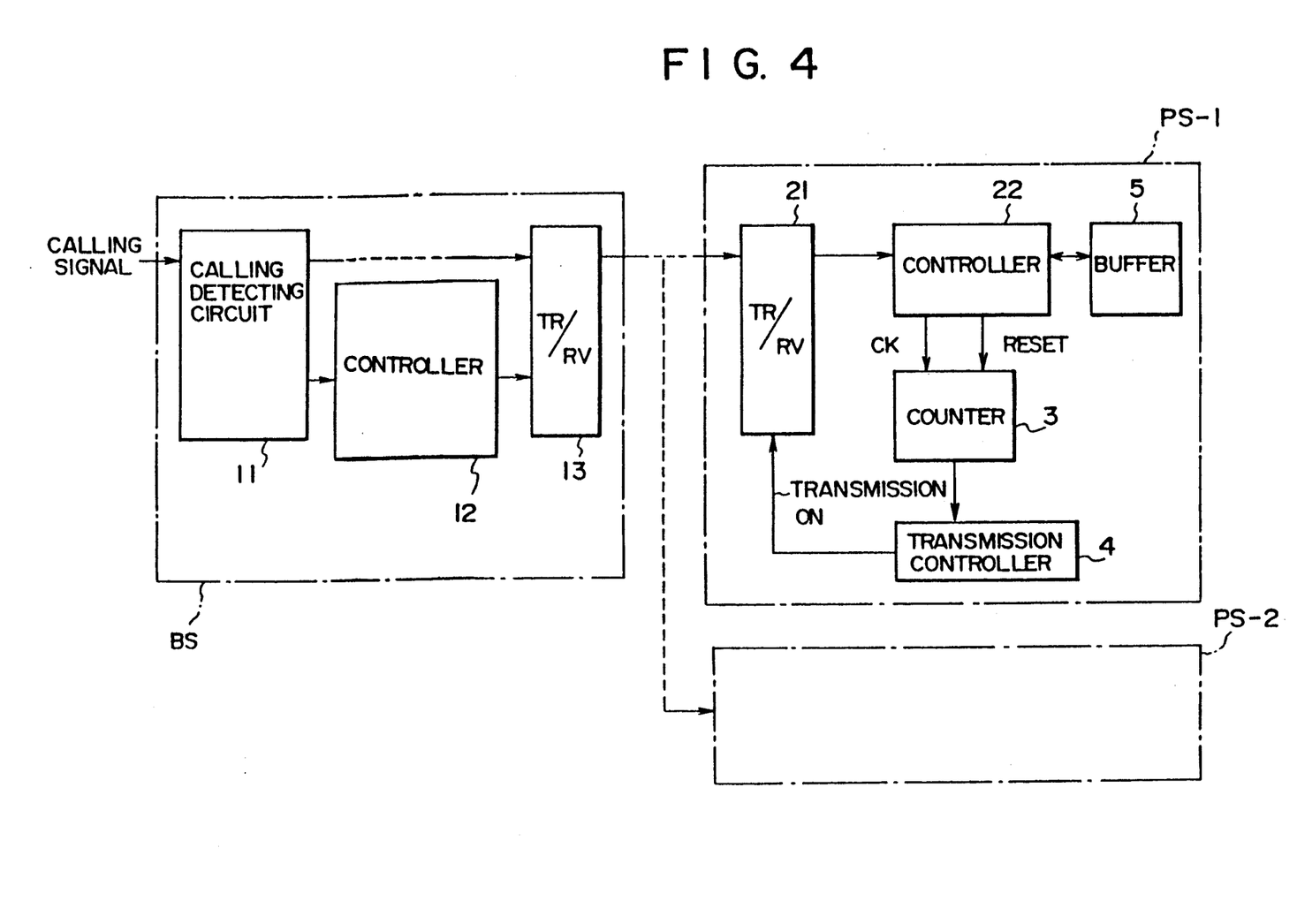
FIG. 4 is a block diagram illustrating an essential part of a cordless phone according to an embodiment of the present invention.

Referring to FIG. 4, a cordless phone is provided with a base station BS and two personal stations; the first personal station PS-1 and the second personal station PS-2. The base station BS comprises a calling detector 11, a controller 12 and a transmitter/receiver 13. The calling detector 11 detects an envelope of a calling signal transmitted from an external station via a line. The controller 12 outputs a control code in synchronism with the output signal from the calling detector 11. Each of the personal stations PS-1 and PS-2 comprises a transmitter/receiver 21, a controller 22, a counter 3, a transmission controller 4 and a buffer 5. The controller 22 generates a reset signal based on a predetermined clock signal and the control code transmitted from the base station BS. The counter 3 counts the clock signal and outputs a count value. The counter 3 is reset to an initial state by the reset signal supplied from the controller 22. The transmission controller 4 generates a transmission-on signal every time the count value of the counter becomes an identification value identifying each of the personal stations PS-1 and PS-2. The transmission-on signal is supplied from the transmission controller 4 to the transmitter/receiver 21, and the transmitter/receiver 21 transmits a carrier signal in synchronism with the transmission-on signal. The buffer 5 stores a response signal to be transmitted in response to a calling.

Figure 5A:
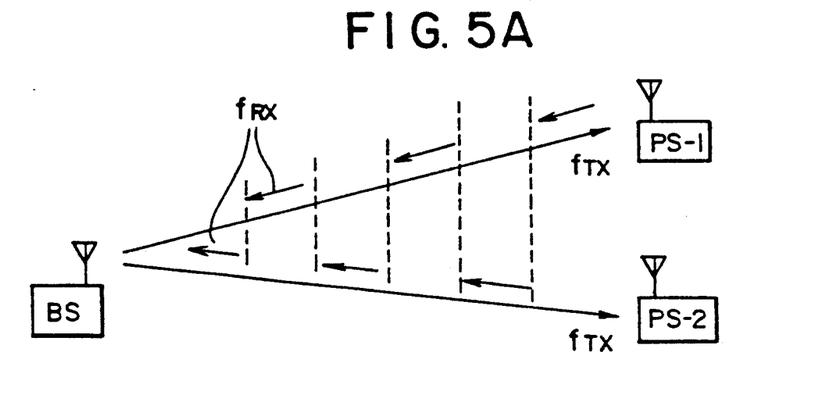
FIGS. 5A, 5B and 5C are diagrams illustrating the principle of operations of the cordless phone according to the embodiment of the present invention.
Figure 5B:
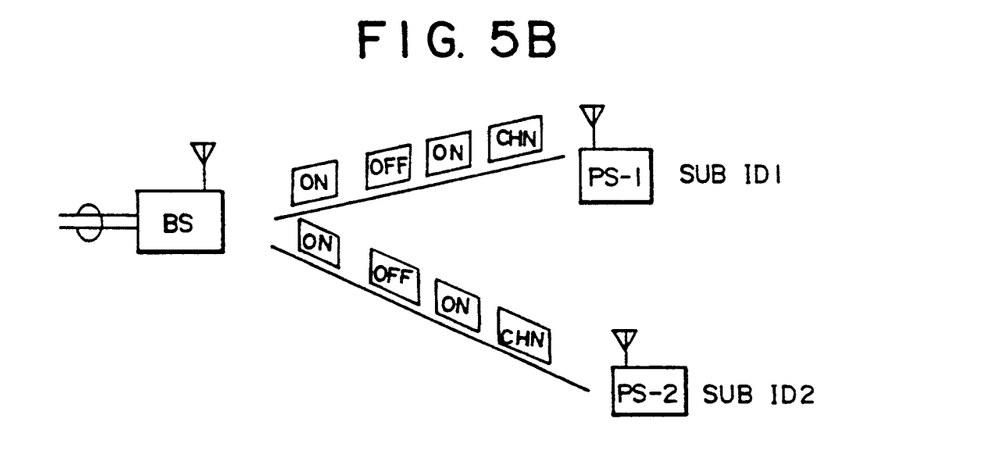

When a calling signal is supplied from an external station to the base station BS via the line, the base station BS assigns the first and second personal stations PS-1 and PS-2 to the same service channel as indicated by $f_{TX}$ and CHN in FIGS. 5A and 5B, and simultaneously informs both the first and second personal stations PS-1 and PS-2 of a call via a control channel (C-CH). The personal stations PS-1 and PS-2 are in a state where signals can be received via the service channel, and are waiting to receive the control code (corresponding to on and off of the envelope of the calling signal) transmitted from the base station BS. In the base station BS, the calling detector 11 detects the envelope of the calling signal and supplies a detecting signal to the controller 12. The controller 12 supplies the control code corresponding to on and off of the envelope of the calling signal to the transmitter/receiver 13. The transmitter/receiver 13 transmits the control code to both the first and second personal stations PS-1 and PS-2 as indicated by ON and OFF in FIG. 5B.

Figure 5C:
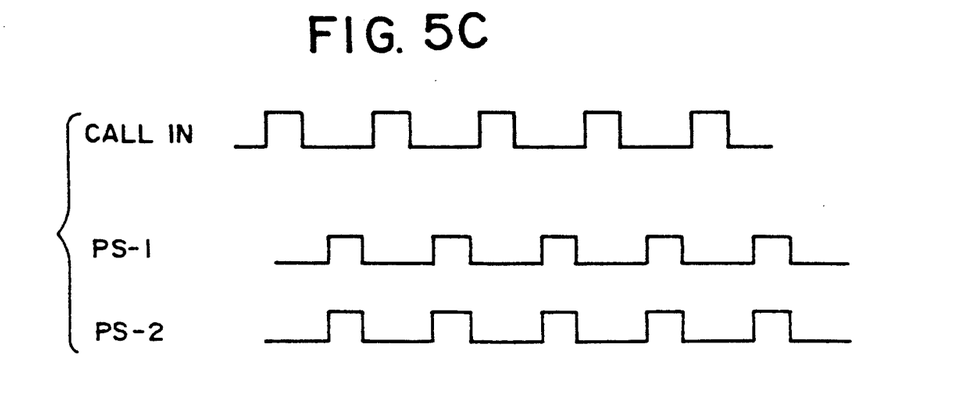

In each of the personal stations PS-1 and PS-2, the transmitter/receiver 21 receives the control code from the base station BS and supplies it to the controller 22. The controller 22 generates a reset signal based on the clock signal and the control code supplied from the transmitter/receiver 21. The reset signal is supplied to the counter 3. The counter 3 is reset to the initial state by the reset signal supplied from the controller 21 and then starts counting. Counting operations in the first and second personal stations are synchronized with each other. Each of the personal station PS-1 and PS-2 outputs a ringing tone in accordance with the control code supplied from the base station BS. As the personal stations PS-1 and PS-2 approximately simultaneously processes the control code, the ringing tones are approximately simultaneously output from both the personal stations PS-1 and PS-2, as shown in FIG. 5C.

In addition, in each of the personal stations PS-1 and PS-2, the transmission controller 4 outputs a transmission-on signal every time the count value of the counter 3 becomes an identification value, so that the carrier signal is transmitted from the transmitter/receiver 21 in synchronism with the transmission-on signal. The identification values of the first and second personal stations PS-1 and PS-2 differ from each other. Thus, times at which the carriers are output from the first and second personal stations PS-1 and PS-2 differ from each other, as indicated by $f_{RX}$ in FIG. 5A. That is, the first and second personal stations PS-1 and PS-1 alternately outputs the carrier signals. The response signal is read out from the buffer 5 and transmitted to the base station BS with the carrier signal.

A description will now be given of an embodiment of the present invention with reference to FIGS. 6A-8.

Figure 6A:
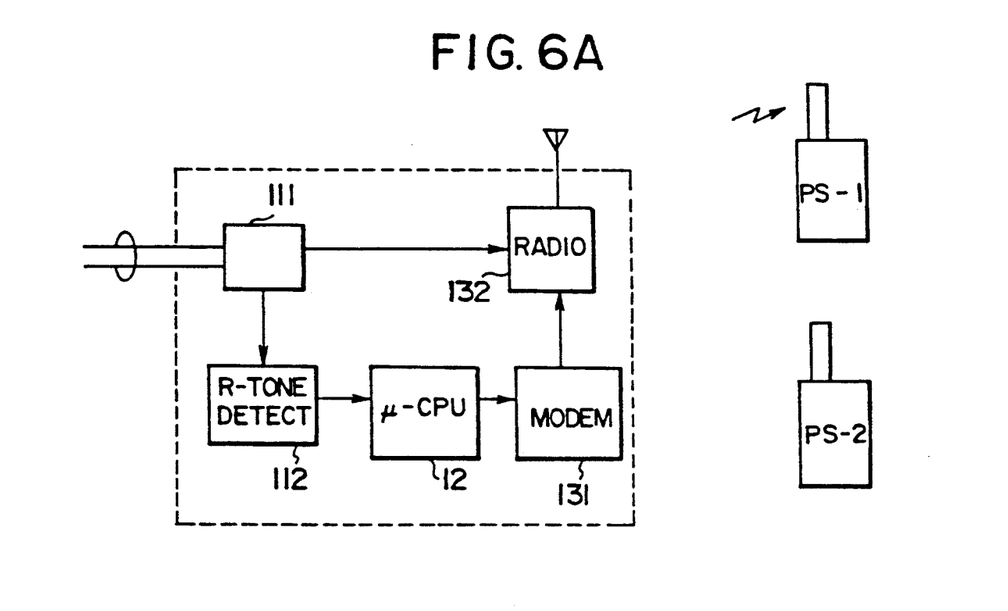
FIGS. 6A and 6B are block diagrams illustrating a base station and each of personal stations of a cordless phone according to an embodiment of the present invention.

FIG. 6A shows a cordless phone according to an embodiment of the present invention. Referring to FIG. 6A, the personal phone has a base station BS, a first personal station PS-1 and a second personal station PS-2. The base station BS has a local line interface 111 connected to a local line, a ringing tone detecting circuit 112, a modem 131, a radio circuit 132 and a controller 12 formed of a microcomputer. The local line interface 111 and the ringing tone detecting circuit 112 correspond to the calling detector 11 shown in FIG. 4. The modem 131 and the radio circuit 132 correspond to the transmitter/receiver 13 shown in FIG. 4.

Figure 6B:
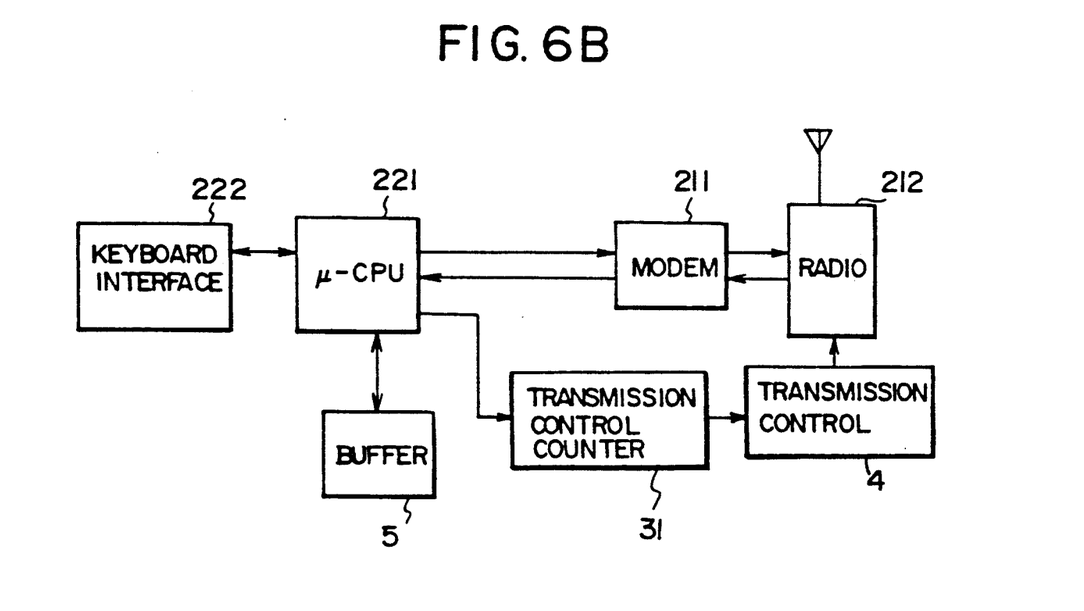

Structures of the first and second personal stations PS-1 and PS-2 are the same as each other. Thus, an essential structure of the first personal stations PS-1 will be described below with reference to FIG. 6B. In FIG. 6B, those parts which are the same as those shown in FIG. 4 are given the same reference numbers.

Referring to FIG. 6B, the first personal station PS-1 has a keyboard interface 222, a microcomputer 221, a modem 211, a radio circuit 212, a transmission control counter 31, the transmission controller 4 and the buffer 5. The microcomputer 221 and the keyboard interface 222 correspond to the controller 22 shown in FIG. 4. The transmission control counter 31 corresponds to the counter 3 shown in FIG. 4. The modem 211 and the radio circuit 212 correspond to the transmitter/receiver 21 shown in FIG. 4.

Figure 7:
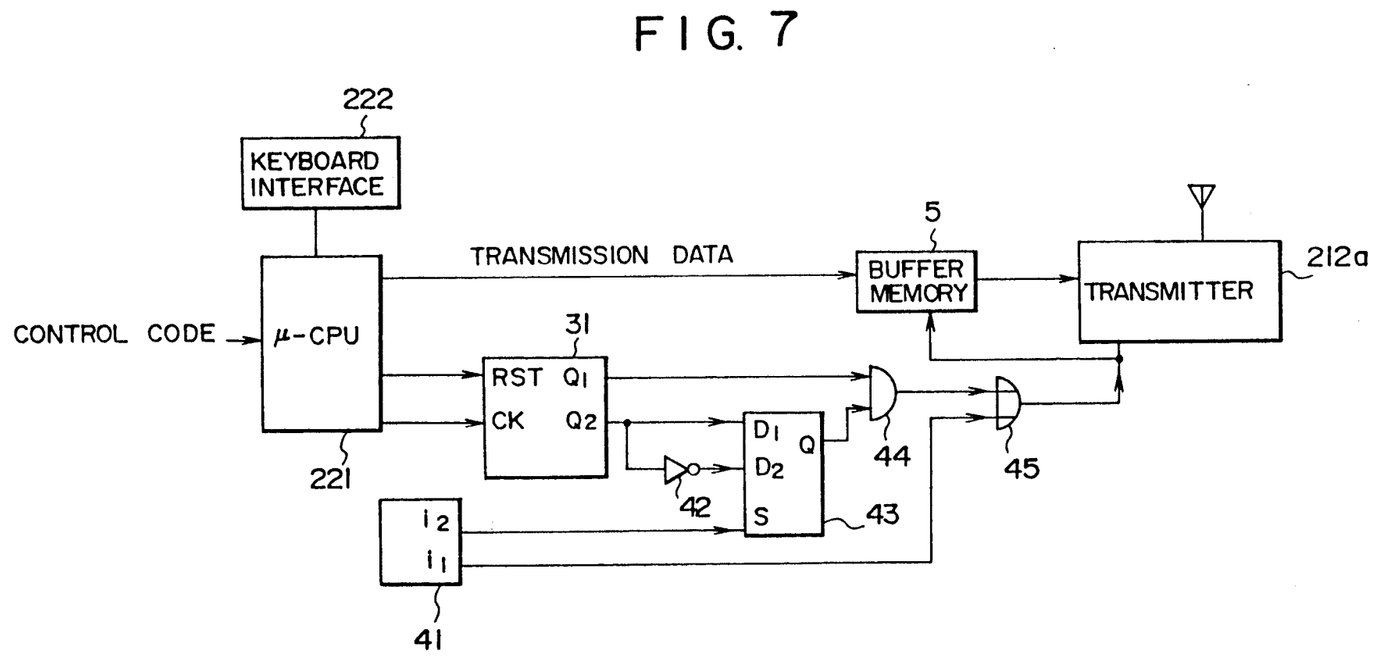
FIG. 7 is a detailed block diagram illustrating a constitution of each of the personal stations of the cordless telephone shown in FIGS. 5B.

The transmission counter 31 and the transmission controller 4 will be described below. Referring to FIG. 7, the transmission control counter 31 is formed of a binary counter having two output terminals Q1 and Q2. The transmission control counter 31 counts a clock signal supplied from the microcomputer 221. Count values (00), (01), (10) and (11) are output in turn from the output terminals (Q2 Q1) of the transmission control counter 31. The count value (01) is, for example, assigned to the first personal station PS-1, and the count value (11) is, for example, assigned to the second personal station PS-2. That is, the count values (01) and (11) are respectively defined as the identification values of the first and second personal stations PS-1 and PS-2. The transmission controller 4 has a control register 41, a selector 43, an AND gate 44 and an OR gate 45. The control register has two bits i1 and i2. The selector 43 has two data input terminals D1 and D2, a control terminal S and an output terminal Q. When a signal "0" is input to the control terminal S of the selector 43, data input to the data input terminal D1 is output from the output terminal Q of the selector 43. When a signal "1" is input to the control terminal S of the selector 43, data input to the data input terminal D2 is output from the output terminal Q of the selector 43. The output terminal Q1 of the transmission control counter 31 and the output terminal Q of the selector 43 are connected to input terminals of the AND gate 44. The output terminal Q2 of the transmission control counter 31 is connected to the data input terminal D1 of the selector 43 directly and connected to the data input terminal D2 of the selector 43 via an inverter 42. Either the output from the AND gate 44 or the bit i2 of the control register 41 is supplied, as a control signal, to a transmission circuit 212a of the radio circuit 212 and to the buffer 5 via the OR gate 45.

In a case where two personal stations are coupled to the base station, the bit i1 of the control register 41 is set to "0". In a case where only one personal station is coupled to the base station, the bit i2 of the control register 41 is set to "1". In the first personal station PS-1, the bit i2 of the control register 41 is set to "1". In the second personal station PS-1, the bit i2 of the control register 41 is set to "0". The response signal is supplied from the microcomputer 221 to the buffer 5 and stored therein.

Figure 8:
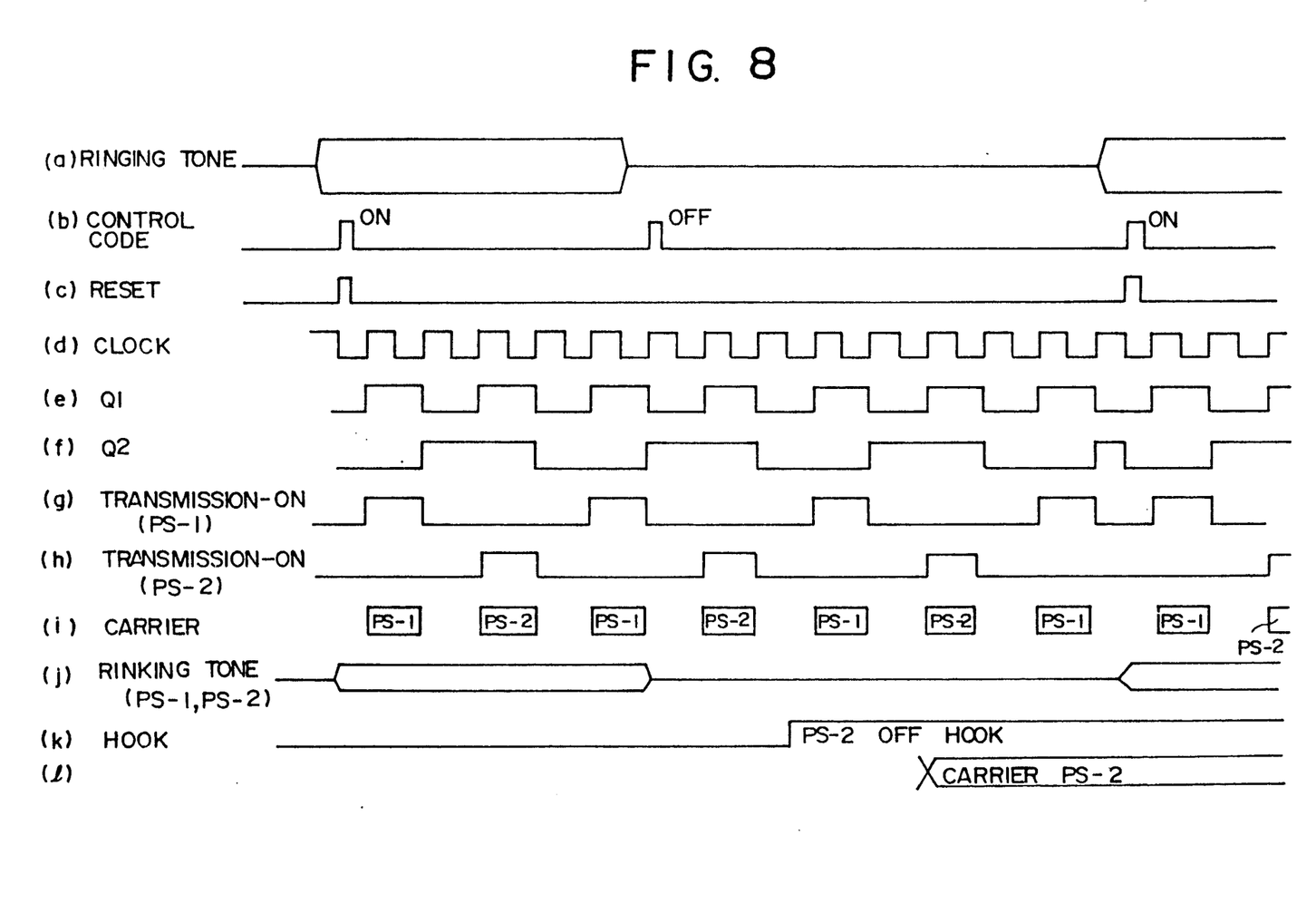
FIG. 8 is a timing chart illustrating a control processing of the cordless phone according to the embodiment of the present invention.

The operation of the cordless phone will be described below with reference to a timing chart shown in FIG. 8.

When this personal phone is called by an external station, the ringing tone signal (the calling signal) is received by the local line interface 111 of the base station BS (a). The ringing tone detecting circuit 112 detects the ringing tone signal received by the local line interface 111, and outputs a detecting signal corresponding to an envelope of the ringing tone signal. The controller 12 inputs the detecting signal from the ringing tone detecting circuit 112, outputs a control code. The control code includes an on code corresponding to an activating of the ringing tone signal and an off code corresponding to a deactivating of the ringing tone signal (b). The control code is supplied from the controller 12 to the radio circuit 132 via the modem 131 and is transmitted from the radio circuit 132 to both the first and second personal stations PS-1 and PS-2 via control channel. The first and second personal stations PS-1 and PS-2 approximately simultaneously receive the control code. Each of the personal stations PS-1 and PS-2 activates a ringing tone starting at a time when the on code is received until a time when the off code is received (j). Thus, first and second personal terminals PS-1 and PS-2 output the ringing tone approximately simultaneously.

The control code received by each of the personal stations PS-1 and PS-2 is supplied to the microcomputer 221. The microcomputer 221 outputs a reset signal in synchronism with the on code of the control code (c). The transmission control counter 31 counts the clock signal (d). The count values (00), (01), (10) and (11) are output in turn from the output terminals (Q2 Q1) of the transmission control counter 31 (e and f). The transmission control counter 31 is reset to (00) by the reset signal supplied from the microcomputer 221. In the first personal station PS-1, the bit i2 "1" of the control register 41 is supplied to the control terminal S of the selector 43. Thus, every time the count value of the transmission control counter 31 becomes (01), the output (Q2=0) of the transmission control counter 31 is inverted by the inverter 42 and is supplied to the AND gate 44 via the selector 43. When this occurs, the output (Q1=1) of the transmission control counter 31 is directly supplied to the AND gate 44. That is, every time the count value of the transmission control counter 31 becomes the identification value (01) identifying the first personal station PS-1, the transmission-on signal (having a value of "1") is supplied from the AND gate 44 to the transmission circuit 212a and the buffer memory 5 (g). The transmission circuit 212a transmits the carrier signal in synchronism with the transmission-on signal (i). In the second personal station PS-2, the bit i2 "0" of the control register 41 is supplied to the control terminal S of the selector 43. Thus, every time the count value of the transmission control counter 31 becomes (11), the output (Q2=1) is supplied to the AND gate 44 via the selector 43. AT this every time, the output (Q1=1) of the transmission control counter 31 is directly supplied to the AND gate 44. That is, every time the count value of the transmission control counter 31 becomes the identification value (11) identifying the second personal station PS-2, the transmission-on signal (having a value of "1") is supplied from the AND gate 44 to the transmission circuit 212a and the buffer memory 5 (h). The transmission circuit 212a transmits the carrier signal in synchronism with the transmission-on signal (i).

As a result, the personal stations PS-1 and PS-2 alternately transmit the carrier signal to the base station BS. Under a condition in which the first and second personal stations PS-1 and PS-2 approximately simultaneously output the ringing tone, when, for example, an off-hook operation of the second personal station PS-2 is carried out, the second personal station PS-2 adds a sub identification code corresponding to the second personal station PS-2 to an off-hook operation code stored in the buffer. Then the sub identification code and the off-hook operation code are transmitted with the carrier signal from the second personal station PS-2 to the base station (k). After the off-hook operation of the second personal station PS-2, the second personal station PS-1 continuously transmits the carrier signal (1). When the base station BS detects that the off-hook operation of the second personal station PS-2 is carried out based on the sub identification code and the off-hook operation code, the base station BS transmits to the first personal station PS-1 a command to stop outputting the ringing tone.

According to the above embodiment, in each of the personal stations PS-1 and PS-2, every time the count value of the transmission control counter becomes the identification value, each of the personal stations PS-1 and PS-2 transmit the carrier signals. Thus, the carrier signals are alternately transmitted from the personal stations PS-1 and PS-2. That is, the carrier signals can be transmitted in the time sharing transmission form in a radio channel between the base station BS and the personal stations. In addition, the transmission control counter 31 is reset by the reset signal in synchronism with the activation of the ringing tone signal, as shown by $t_{reset}$ in FIG. 8. Thus, the count operations in both the first and the second personal stations PS-1 and PS-2 are synchronized with each other. Further, the first and second personal stations PS-1 and PS-2 output the ringing tones in synchronism with the control code. Thus, as the ringing tones are approximately simultaneously output from both personal stations PS-1 and PS-2, the ringing tones output from the personal stations PS-1 and PS-2 are prevented from being offensive to the ear.

If four personal stations are coupled to the base station, each of the personal stations is provided with a 3-bit counter.

The present invention is not limited to the aforementioned embodiments, and variations and modifications may be made without departing from the scope of the claimed invention.

What is claimed is:

1. A cordless phone comprising a base station coupled to a line and a plurality of a personal stations communicating with said base station by radio, said base station comprising:
   call detecting means for detecting a calling signal corresponding to a ringing tone when said cordless phone is called by an external station;
   control signal generating means, coupled to said call detecting means, for generating a control signal in synchronism with the calling signal detected by said call detecting means; and
   means, coupled to said control signal generating means, for transmitting the control signal generated by said control signal generating means to said plurality of personal stations simultaneously;
   each of said personal stations comprising:
   ringing tone output means for outputting a ringing tone in synchronism with the control signal received by said each of said personal stations;
   counter means for counting a predetermined clock signal;
   reset means for resetting said counter means to be in an initial state in synchronism with the control signal received by said each of said personal stations; and
   carrier transmission means for transmitting a carrier signal to said base station every time a count value of said counter means becomes an identification value identifying said each of said personal stations, a predetermined response signal being transmitted to said base station with the carrier signal.

2. A cordless phone as claimed in claim 1, wherein said call detecting means of said base station has means for detecting an envelope of the calling signal.

3. A cordless phone as claimed in claim 2, wherein the control signal generated by said control signal generating means of said base station includes a first signal corresponding to an activating of the envelope of the calling signal detected by said call detecting means and a second signal corresponding to deactivating of the envelope of the calling signal detected thereby.

4. A cordless phone as claimed in claim 3, wherein said ringing tone output means of each of said personal station starts outputting the ringing tone when the first signal is received and stops outputting the ringing tone when the second signal is received.

5. A cordless phone as claimed in claim 3, wherein said reset means of each of said personal station resets said counter means to be in the initial state in synchronism with the first signal.

6. A cordless phone as claimed in claim 1, wherein said carrier transmission means of each of said personal stations has determination means for determining whether or not the count value of said counter means is the identification value, and wherein, when said determination means determines that the count value of said counter means is the identification value, said transmission means transmits the carrier signal to said base station.

* * * * *

UNITED STATES PATENT AND TRADEMARK OFFICE
CERTIFICATE OF CORRECTION

PATENT NO. : 5,325,420
DATED : June 28, 1994
INVENTOR(S) : Tetuya Kikuchi

It is certified that error appears in the above-identified patent and that said Letters Patent is hereby corrected as shown below:

On the title page : Item [54] and Column 1, line 1,

--CORDLESS PHONE HAVING A PLURALITY OF PERSONAL STATIONS--.

Col. 1, line 2, please change "HAAVING" to --HAVING--.

Signed and Sealed this

Sixth Day of September, 1994

Attest:

BRUCE LEHMAN

*Attesting Officer*    *Commissioner of Patents and Trademarks*